US012515780B2

(12) United States Patent
Wall et al.

(10) Patent No.: US 12,515,780 B2
(45) Date of Patent: Jan. 6, 2026

(54) DOOR ASSEMBLY

(71) Applicant: B/E Aerospace (UK) Limited, Leighton Buzzard (GB)

(72) Inventors: Daniel H. Wall, Baldock (GB); David Andrew Stephenson, Bristol (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 0 days.

(21) Appl. No.: 18/962,208

(22) Filed: Nov. 27, 2024

(65) Prior Publication Data

US 2025/0196992 A1 Jun. 19, 2025

(30) Foreign Application Priority Data

Dec. 14, 2023 (EP) .................................... 23216767

(51) Int. Cl.
  *B64C 1/14* (2006.01)
  *A47B 31/06* (2006.01)
  *B64D 11/00* (2006.01)
  *B64D 11/04* (2006.01)

(52) U.S. Cl.
  CPC ............ *B64C 1/1407* (2013.01); *A47B 31/06* (2013.01); *B64D 11/04* (2013.01); *B64D 11/0007* (2013.01)

(58) Field of Classification Search
  CPC .......................... B64D 11/04; B64D 11/0007
  See application file for complete search history.

(56) References Cited

U.S. PATENT DOCUMENTS

| 9,889,935 B2 | 2/2018 | Burd |
| 2013/0076214 A1 | 3/2013 | Chamberlin et al. |
| 2014/0152027 A1* | 6/2014 | Burd ............... E05C 19/028 292/200 |
| 2014/0366454 A1 | 12/2014 | Burd |
| 2015/0203203 A1 | 7/2015 | McIntosh |

(Continued)

FOREIGN PATENT DOCUMENTS

| EP | 2312973 | 10/2012 |
| EP | 3568559 | 9/2021 |

(Continued)

OTHER PUBLICATIONS

European Patent Office, European Search Report dated May 22, 2024 in Application No. 23216767.6.

*Primary Examiner* — Nicholas McFall
*Assistant Examiner* — Justin Michael Heston
(74) *Attorney, Agent, or Firm* — SNELL & WILMER L.L.P.

(57) ABSTRACT

A door assembly for an aircraft galley is provided. The door assembly comprises a support frame and a door, wherein the support frame comprises a first engagement feature and a second engagement feature. When the door is in a closed position, the first engagement feature is configured to engage the door at a first engagement point and the second engagement feature is configured to engage the door at a second engagement point. The door comprises an internal structure, wherein the internal structure comprises a structural component that extends across the door between the first and second engagement points, such that the first engagement feature, the second engagement feature and the structural component provide kick retention when the door is in the closed position.

14 Claims, 5 Drawing Sheets

(56) References Cited

U.S. PATENT DOCUMENTS

| | | |
|---|---|---|
| 2017/0050733 A1 | 2/2017 | Miron et al. |
| 2020/0248907 A1 | 8/2020 | Klok et al. |
| 2021/0107655 A1* | 4/2021 | Mair .................. B64D 11/0007 |
| 2023/0052125 A1 | 2/2023 | Latcham |

FOREIGN PATENT DOCUMENTS

| | | | |
|---|---|---|---|
| JP | 2020152051 | 9/2020 | |
| WO | 2007129333 | 11/2007 | |
| WO | 2013144068 | 10/2013 | |
| WO | 2015150829 | 10/2015 | |
| WO | WO-2018132575 A1 * | 7/2018 | ........... B64C 1/1423 |

* cited by examiner

DOOR ASSEMBLY

CROSS-REFERENCE TO RELATED APPLICATIONS

This application claims priority to EP patent application Ser. No. 23/216,767.6, filed Dec. 14, 2023 and titled "DOOR ASSEMBLY," which is incorporated by reference herein in its entirety for all purposes.

FIELD

The invention relates to a door assembly for an aircraft galley, an aircraft galley structure and an aircraft.

BACKGROUND

A galley, for example an aircraft galley, may include one or more storage units for storing certain items. Trolleys are used in aircraft galleys to store items such as food and drink. Trolleys are removed from the aircraft galley to permit access to stored items and to move them around the aircraft, but they are retained in the aircraft galley at other times for safety.

Several considerations are required when designing aircraft galleys and trolleys since the galley may experience significant movement during use. In order to retain items in place, trolleys are typically stored in a galley. The trolleys may be retained in the galley with one or more primary retainers, such as turn buttons, to hold the trolley in place and prevent it escaping from the galley when loaded and against excessive movement. The trolley may be behind a door for aesthetic improvement or for refrigeration purposes.

SUMMARY

In a first aspect, there is provided door assembly for an aircraft galley, the door assembly comprising a support frame and a door, wherein the support frame comprises a first engagement feature and a second engagement feature, wherein when the door is in a closed position, the first engagement feature is configured to engage the door at a first engagement point and the second engagement feature is configured to engage the door at a second engagement point, wherein the door comprises an internal structure, wherein the internal structure comprises a structural component that extends across the door between the first and second engagement points, such that the first engagement feature, the second engagement feature and the structural component provide kick retention when the door is in the closed position.

By providing an internal structure with a structural component arranged as described, a door assembly is provided that is suitably strong to hold a trolley in a galley as required. Providing suitable restraint for a trolley in a galley, particularly as an integral part of the door means that separate components are not required, thus reducing the likelihood of mechanical failure of additional components and increasing safety. The door assembly as described herein has the advantage that the door is lightweight which is important in aircraft design.

The first engagement point may be positioned on a lower portion of the door.

The second engagement point may be positioned on an upper portion of the door.

The structural component may extend diagonally across the door.

The structural component may extend substantially linearly between the first and second engagement points.

The support frame may comprise a door frame.

The door may comprise a front panel that overlies the internal structure.

The door may comprise a rear panel opposite the front panel.

The thickness of the door may be between approximately 10 mm and 15 mm. The thickness of the door may be 13 mm.

The door may be approximately 300 mm to 400 mm wide. The door width may be approximately 330 mm.

The height of the door may be approximately 1000 mm.

The door may comprise an insulating region between the front and rear panels.

The insulation region may comprise an insulating material.

The insulation region may be hollow or optionally be a vacuum insulation region.

The internal structure of the door may be formed of a composite material.

The composite material may be, for example, carbon fiber or molded glass fiber. The door frame may be non-metallic.

The first engagement feature may comprise a spigot.

The first engagement feature may comprise corresponding engagement elements on each of the support frame and the internal structure.

The internal structure engagement feature may comprise a protruding feature and the support frame comprises a recess to engage the protruding feature.

The door assembly may comprise a hinge and the first engagement point may optionally be at the hinge.

The second engagement feature may comprise a moveable turn button.

The second engagement feature may comprise two moveable turn buttons.

In a second aspect, there is provided a galley structure comprising the door assembly as described herein.

In a third aspect, there is provided a galley comprising the galley structure as described herein and a trolley.

In a fourth aspect, there is provided an aircraft comprising the galley structure or a galley as described.

BRIEF DESCRIPTION OF THE DRAWINGS

Various examples will now be described with reference to the accompanying drawings in which.

DETAILED DESCRIPTION

Figure 1:
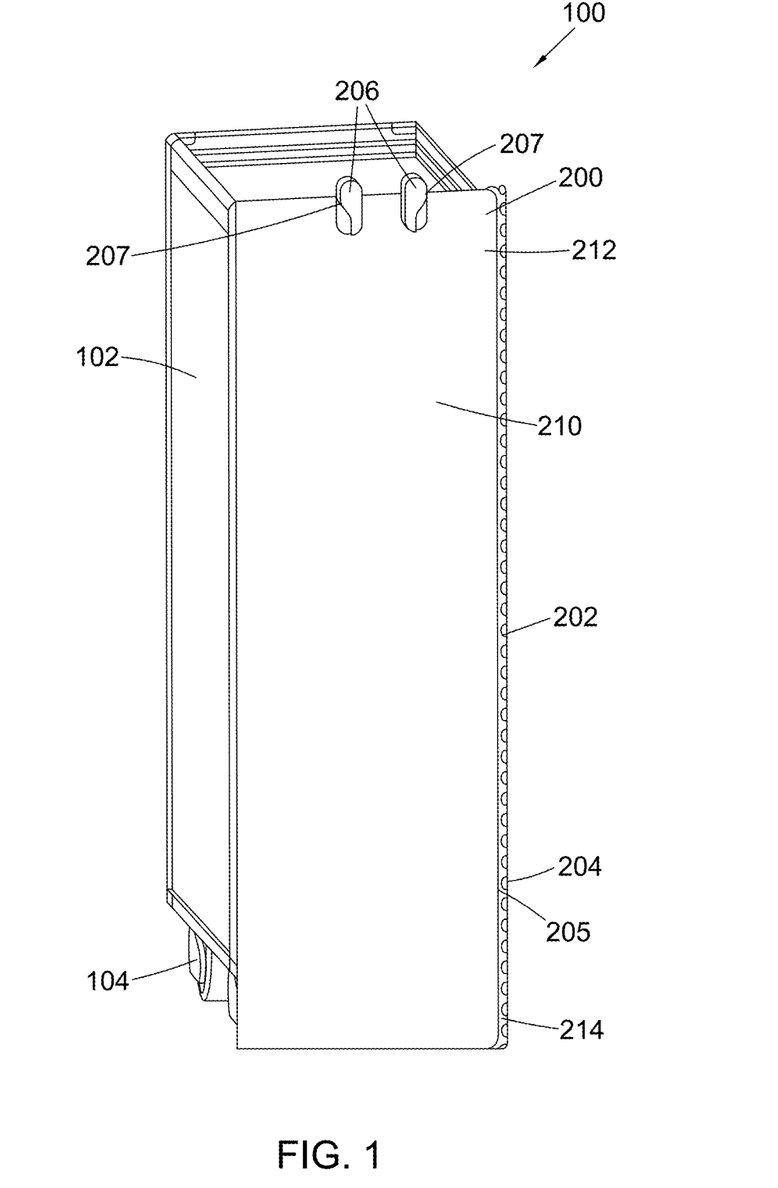
FIG. 1 shows a perspective view of an aircraft galley with a door assembly in a closed position.

With reference to FIG. 1, an aircraft galley 100 comprises a galley housing (not shown) and a trolley 102. The trolley 102 has a generally cuboidal shape. The trolley 102 is supported by wheels 104 to permit the trolley 102 to be moved around an aircraft.

The trolley 102 is stored within the galley housing via a housing opening when it is not being moved around an aircraft. In use, the trolley 102 may be inserted into the aircraft galley 100 through the housing opening and towards the rear of the aircraft galley 100. When the trolley 102 is received in the galley housing, the trolley 102 is fully positioned within the housing such that it does not protrude from the front of the housing.

The galley comprises a door assembly 200. The door assembly 200 comprises a support frame 202 and a door 210.

The door 210 has an upper portion 212 (e.g. above a horizontal centerline of the door 210 defined with respect to the aircraft) and a lower portion 214 (e.g. below the horizontal centerline of the door 210) as defined when the door 200 is provided within the galley housing. The door 210 is substantially planar and flat. The door 210 is sized to cover the whole of a front of the trolley 102 when the trolley 102 is positioned within the galley housing. In examples, the door 210 may cover part of the front of the trolley 102. In examples, the door 210 may cover more than half of the front of the trolley 102.

The support frame 202 is attached to the galley housing and is arranged to support and engage the door 210.

The support frame 202 is a substantially upright beam that forms a one-sided frame. In examples, the support frame 202 may be a two-, three-, or four-sided door frame. The door 210 is supported on the support frame 202 by hinges 301. The hinges 301 allow for the door to be opened outwards such that the trolley 102 may be moved from within the galley housing.

The door assembly 200 comprises a first engagement feature 204 which engages the door 210 to the support frame 202 at a first engagement point 205 when the door is in a closed position.

Figure 2:
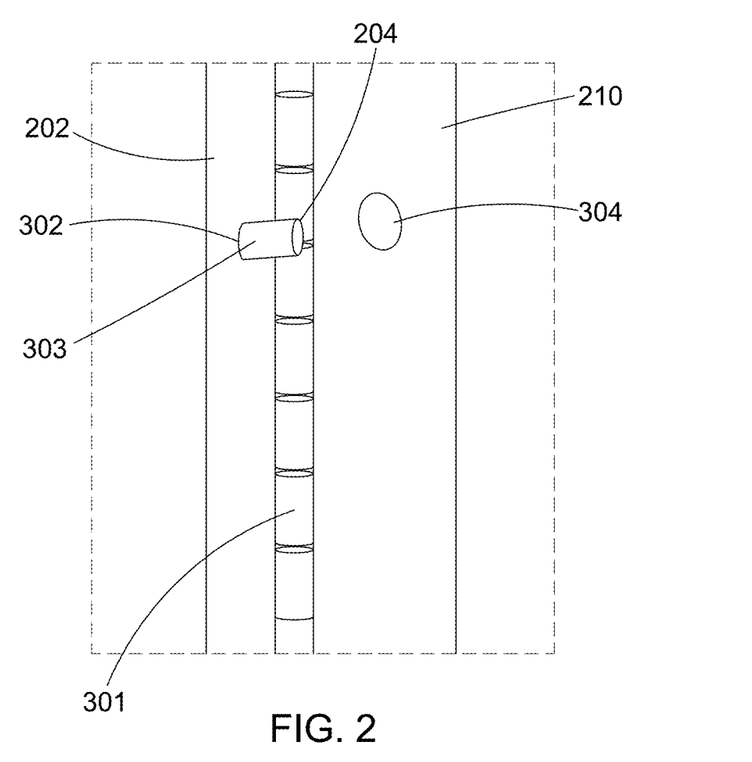
FIG. 2 shows a perspective view of part of the door assembly in an open position.

The first engagement feature 204 is shown in FIG. 2, with a hinge 301. A standard door hinge 301 is provided in this example, although it is envisaged that alternative suitable hinges to allow opening of the door 210 may be provided.

The first engagement feature 204 is provided in the form of a hinge bolt. The hinge bolt comprises corresponding engagement elements on each of the support frame 202 and the door 210. The hinge bolt comprises a spigot 302 on the support frame 202 and a recess 304 on the door 210. The spigot 302 comprises a protruding feature 303 arranged on the door 210 and a corresponding recess 304 on the support frame 202. The protruding feature 303 may comprise a cylinder-shaped metal element that protrudes laterally from the frame 202. The recess 304 may comprise a reinforcing mount that surrounds the recess 304. The hinges 301 and/or the protruding feature 303 may be secured by screws. A reinforcing mount 306 may additionally or alternatively be supported by screws.

The recess 304 on the support frame 202 is configured to engage and receive the protruding feature on the door 210. This provides a strong first engagement point 205 (resisting loads acting in a direction normal to the plane of the door 210) between the door 210 and the frame 202 which is moveable as the door 210 opens or closes on the hinges 301. In examples, the support frame 202 may comprise a protruding feature 302 and the door 210 may comprise a suitable recess 304. In examples, the first engagement feature may be at the hinge and formed as a hinge. In examples, other suitable securing and means may be provided at the first engagement point.

Referring back to FIG. 1, the door assembly 200 comprises second engagement features 206 which engage that door 210 to the support frame 202 at second engagement points 207 when the door is in a closed position. The second engagement features 206 are provided on the upper portion 212 of the door 210. Two second engagement features 206 are provided. The second engagement features 206 are provided at the top of the support frame 202 to engage with the upper portion 212 of the door 210 at second engagement points 207. The second engagement features 206 may be spaced towards the center of the upper portion 212 of the door 210. In examples, the second engagement features may be positioned to a side of the door assembly 200.

The second engagement features 206 are provided as turn buttons. A turn button comprises a lever that can be rotated around a fixed point on the support frame 202. In a retaining position, the lever overlies part of the door 210 and partially blocks part of the upper portion 212 of the door 210. The lever may be approximately 70 mm in length. In embodiments, the lever may be more or less than 70 mm in length In the retaining position, the lever holds the door 210 in a closed position at the engagement points 207. In turn, the door 210 holds the trolley 102 in the galley housing. In a release position, the lever is rotated such that it does not overlie any part of the door 210. As such, the door 210 can be freely opened. In turn, the trolley 102 can be removed from the galley housing. Rotation of the lever of the turn button may be restricted to 90 degrees such that it is providing a maximum blockage on the door 210 in the retaining position (e.g. with the turn button extending substantially downwardly and/or normal to the frame in the retaining position). In examples, a single second engagement feature 206 is provided. A single second engagement feature 206 may be provided towards the center of the upper portion 212 of the door 210. In examples, the single second engagement feature 206 may be provided at the upper portion 212 of the door 210 towards the side of the door 210 that is furthest from the first engagement feature 204.

It will be appreciated that while only a single trolley 104 is shown in FIG. 1, the aircraft galley 100 may be sized to accommodate a plurality of trolleys 102. Such trolleys 104 may be accommodated laterally adjacent to each other in a side by side configuration. In such a configuration, a plurality of support frames 202 may be provided. Alternatively or additionally, the trolleys 102 may be shorter than a depth of the aircraft galley (measured from the rear to the front of the aircraft galley), and may be accommodated in an end to end configuration.

Figure 3:
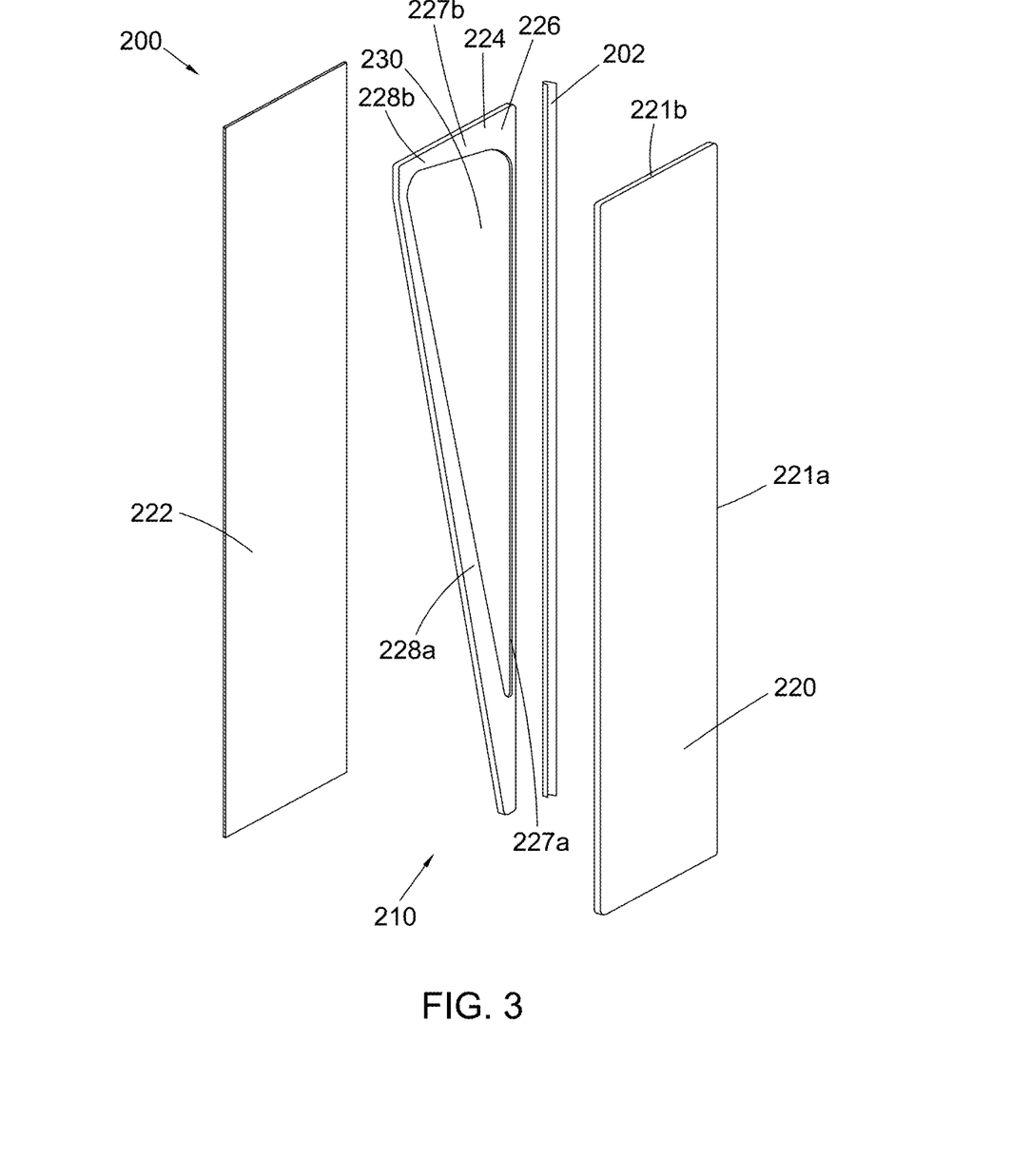
FIG. 3 shows an exploded perspective view of a door assembly.

Referring to FIG. 3, the components of the door 210 are shown. The door assembly comprises the support frame 202 and the door 210. The door 210 comprises a front panel 220, a rear panel 222 and an internal structure 224. The door 210 has a layered structure. The front panel 220 overlies the internal structure 224 at one side of the internal structure 224 and the rear panel 222 overlies the internal structure 224 at its opposing side.

The front panel 220 is substantially planar and rectangular in shape, with two opposing long sides 221a and two opposing short sides 221b. The long sides 221a extend longitudinally (e.g. vertically with respect to the aircraft) from the upper portion 212 of the door 210 to the lower portion 214. The short sides 221b each extend laterally (e.g. horizontally with respect to the aircraft) along the edges at the upper portion 212 and the lower portion 214. The rear panel 222 is correspondingly shaped and provided opposite the front panel 220. As such, external surfaces of each of the front panel 220 and rear panel 222 provide the external surfaces of the door 210. The thickness of the door 110 is around13 mm. The thickness may be between approximately 10 mm and 15 mm. The door is approximately 330 m wide. In examples, the width of the door may be approximately 300 mm to 400 mm. The height of the door may be approximately 1000 mm.

Positioned between the front panel 220 and the rear panel 222 of the door 210 is an internal structure 224. The internal structure 224 is substantially flat. The internal structure 224 is provided as a frame with a two-sided outer border 226 comprising long side 227a and short side 227b. The long side 227a extends longitudinally (e.g. vertically) from the upper portion 212 of the door to the lower portion 214 and is on the hinge side of the door 210. The short side 227b extends laterally (e.g. horizontally) along the edge at the upper portion 212 adjacent to the upper part of the frame 202. Each of long side 227a and short side 227b is dimensioned to align with one of each of the long sides 221a and short sides 221b of the front panel 220 of the door 210 respectively. The two sides of the border 226 are connected with a structural component 228.

The internal structure 224 has a width and a thickness that is suitable to act as a structural element to support a trolley 102 to be held within the galley 100. The internal structure is formed from a composite material, such as carbon fiber. This is a lightweight material which is advantageous for the function of the door 210. The space 230 that is formed inside the internal structure 224 by the border 226 and the structural component 228 is a hollow area. As such, the door is of a lighter weight than existing solid doors which is beneficial in aircraft design and for ease of use. Further, the hollow area acts as an insulating region of the door 210 to provide thermal benefits. In examples, the hollow area may be filled with an insulating material or be a vacuum insulation region. This may be particularly beneficial if the trolley 102 is to be used to store refrigerated food.

The structural component 228 extends across the door 210. As described with respect to FIG. 1, the door assembly 200 comprises a first engagement point 205 and a second engagement point 207 between the door 210 and the support frame 202. The structural component 228 extends across the door between these first 205 and second 207 engagement points. Part of the first engagement feature 204 may be provided as part of the internal structure 224 of the door.

Figure 4:
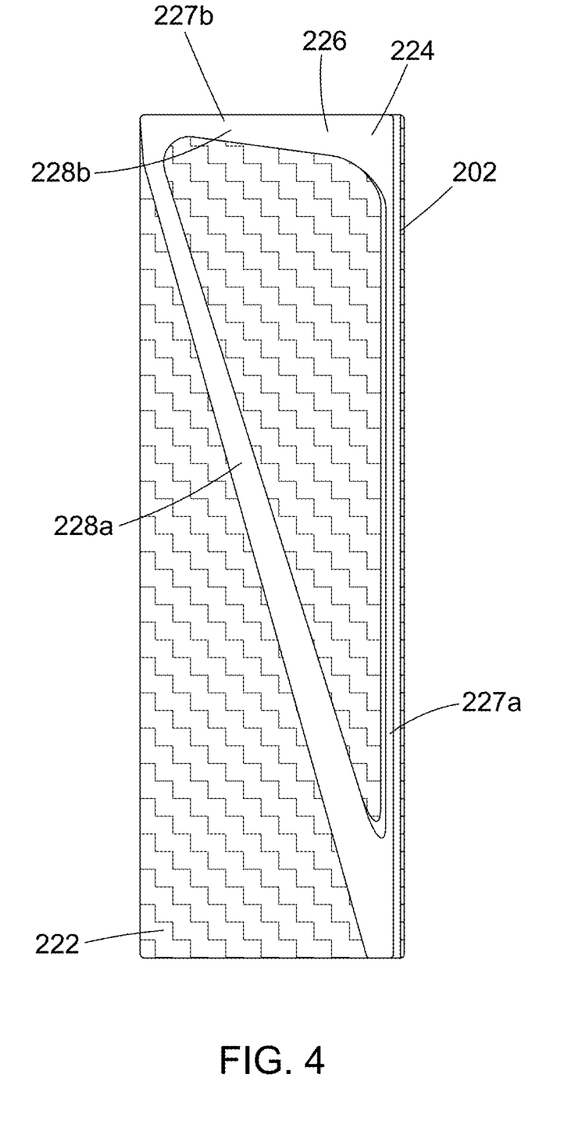
FIG. 4 shows a cross-sectional plan view of a door assembly.

FIG. 4 shows a cross-sectional plan view of the door assembly 200, in particular the internal structure 224. The internal structure 224 forms a substantially triangular shape. The structural component 228 extends between the first 205 and second 207 engagement points, extending across a face of the door 202. The structural component 228 also includes parts of one or both of the sides 227a, 227b of the internal structure 224 of the door 210 such that the structural component extends adjacent to the first 205 and second 207 engagement points. As such, the structural component 228 extends diagonally across the door 210. The structural component 228 further extends along the side 227b of the door.

As such, in the present example, the structural component 228 comprises a diagonally extending structural element 228a and a side structural element 228b. The diagonally extending structural element 228a extends across the face of the door 202 e.g. not extending along sides of the door 202. In other examples, the structural component 228 may consist of a diagonally extending structural element 228a, which may extend directly between the first and second engagement points.

Figure 5:
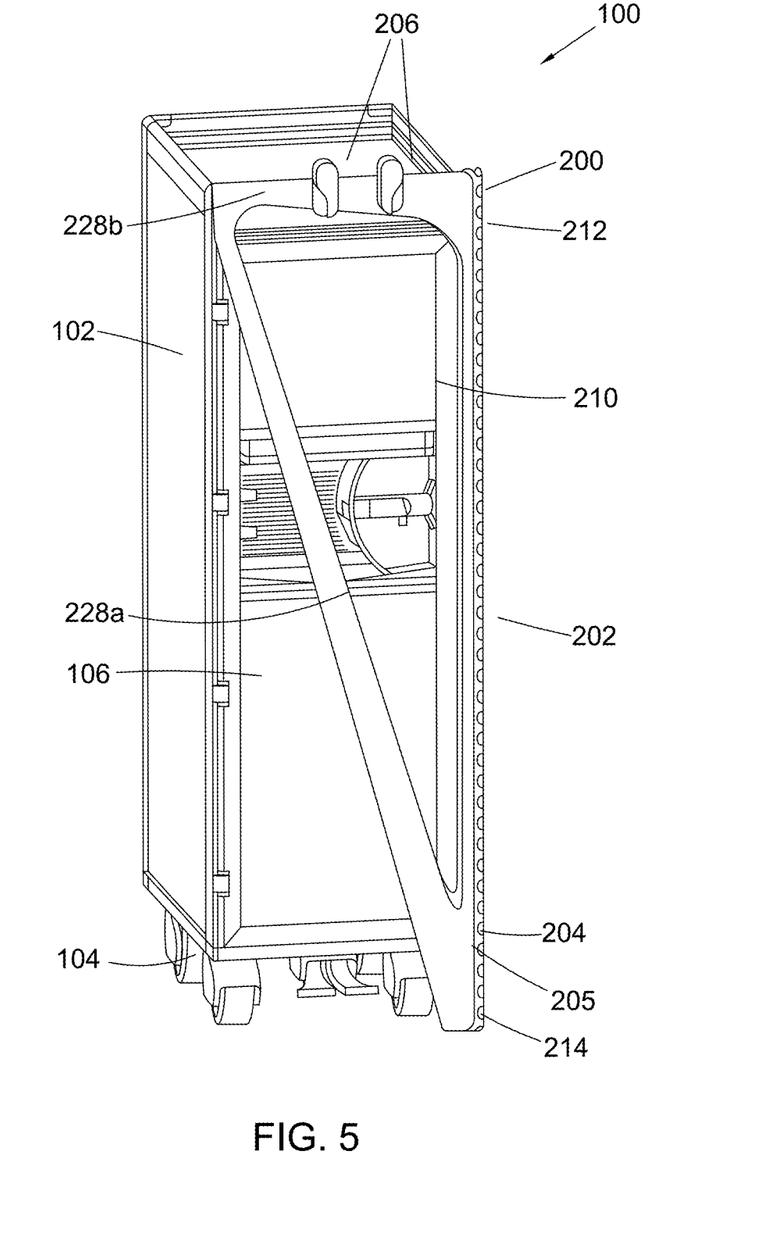
FIG. 5 shows a schematic perspective view of an aircraft galley with part of the door assembly.

In use, the structural component 228 of the door, the first engagement feature 204 and the second engagement feature 206 provide a kick retention for the door assembly when the door 210 is in the closed position. Kick retention refers to a trolley 102 in the galley 100 being secured such that movement within the galley is suitable restrained. In particular, kick retention refers to a situation where the trolleys 102 may be shorter than a depth of the aircraft galley (measured from the rear to the front of the aircraft galley). This means that the trolley may have exclusive movement from its bottom end towards lower portion 214 of the door 210 since it can rotate towards the rear of the galley. By providing the structural component 228 diagonally across the door 210, along with the engagement features, this type of movement may be restricted FIG. 5 shows the first engagement feature 204 and the second engagement features 206 in combination with the internal structure 224 in a closed position as part of a galley 100. The trolley 102 has its own door 106 at the front of the galley housing that lies beneath the internal structure 224 of the door 210 of the door assembly 200.

As shown, the structural component 228 extends diagonally between first engagement point 205 towards the lower portion 214 of the door 210 and second engagement point 207 at the upper portion 212 of the door 210. The second engagement point 207 is defined by the engagement of the door 210 to the support frame 202 towards the upper portion 212 of the door. The second engagement elements 206 are turn buttons at the upper portion 212 of the door 210.

In use, the structural component 228 and holds the trolley 102 within the galley housing. Movement of an aircraft, such as pitching during take-off, puts force on the door 210 of the door assembly 210. Due to the configuration structural component 228 in the door 210, the trolley will be restrained such that it remains in position within the galley housing. This is important in order to meet stringent for safety requirements of an aircraft.

The arrangement of the structural component 228 also means that additional restraint components are not required towards the lower end 214 of the door 210, therefore reducing the chance of mechanical failure in the galley. Providing suitable restraint for a trolley 102 in a galley, particularly as an integral part of the door 210 means that separate components are not required, thus reducing the likelihood of mechanical failure of additional components and increasing safety.

The door assembly as described herein additionally has the advantage that the door 210 is lightweight. Further, the door may be more insulated as compared to existing door assemblies. For example, existing door assemblies may use metal components throughout which provide cold bridges, making the doors less thermally insulating.

In examples, long side 221a of the internal structure 224 is omitted so that the shape of the internal structure 224 is substantially shaped like a number seven. The space around the edge of the door 210 between the front panel 220 and the rear panel 222 may be filled.

In examples, the first 204 and second 206 engagement features may be provided on the door 210 rather than the frame 202, provided that the suitable engagement points 205, 207 therebetween are provided.

In examples, one or both of the front panel 220 or the rear panel 222 of the door may be omitted. This may be advantageous to reduce the weight of the door 210 while still receiving the appropriate restraint properties provided by the internal structure 224.

In examples, the door 210 may comprise additional features, such as a handle, an upper or lower seal and/or edge trim.

Various aspects of the apparatus and methods disclosed in the various embodiments may be used alone, in combination, or in a variety of arrangements not specifically discussed in the embodiments described in the foregoing, and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A door assembly for an aircraft galley, the door assembly comprising:
 a support frame; and
 a door,
 wherein the support frame comprises a first engagement feature and a second engagement feature, wherein when the door is in a closed position, the first engagement feature is configured to engage the door at a first engagement point and the second engagement feature is configured to engage the door at a second engagement point,
 wherein the door comprises an internal structure, wherein the internal structure comprises a structural component that extends across the door between the first and second engagement points, such that the first engagement feature, the second engagement feature and the structural component provide kick retention when the door is in the closed position, wherein the structural component extends diagonally across the door.

2. The door assembly of claim 1, wherein the first engagement point is positioned on a lower portion of the door.

3. The door assembly of claim 1, wherein the second engagement point is positioned on an upper portion of the door.

4. The door assembly of claim 1, wherein the support frame comprises a door frame.

5. The door assembly of claim 1, wherein the door comprises a front panel that overlies the internal structure.

6. The door assembly of claim 5, wherein the door comprises a rear panel opposite the front panel.

7. The door assembly of claim 6, wherein the door comprises an insulating region between the front and rear panels.

8. The door assembly of claim 1, wherein the internal structure is formed of a composite material.

9. The door assembly of claim 1, wherein the first engagement feature comprises a spigot.

10. The door assembly of claim 1, wherein the door assembly comprises a hinge and the first engagement point is at the hinge.

11. The door assembly of claim 1, wherein the second engagement feature comprises a moveable turn button.

12. A galley structure comprising the door assembly of claim 1.

13. A galley comprising the galley structure of claim 12 and a trolley.

14. An aircraft comprising the galley structure of claim 12.

* * * * *